US009071841B2

(12) United States Patent
Holcomb et al.

(10) Patent No.: US 9,071,841 B2
(45) Date of Patent: Jun. 30, 2015

(54) VIDEO TRANSCODING WITH DYNAMICALLY MODIFIABLE SPATIAL RESOLUTION

(75) Inventors: Thomas W. Holcomb, Bothell, WA (US); Chih-Lung B. Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 650 days.

(21) Appl. No.: 13/109,554

(22) Filed: May 17, 2011

(65) Prior Publication Data

US 2012/0294355 A1 Nov. 22, 2012

(51) Int. Cl.
| | |
|---|---|
| *H04B 1/66* | (2006.01) |
| *H04N 19/40* | (2014.01) |
| *H04N 19/172* | (2014.01) |
| *H04N 19/15* | (2014.01) |
| *H04N 19/132* | (2014.01) |
| *H04N 19/14* | (2014.01) |
| *H04N 19/157* | (2014.01) |

(52) U.S. Cl.
CPC ............. *H04N 19/40* (2014.11); *H04N 19/172* (2014.11); *H04N 19/15* (2014.11); *H04N 19/132* (2014.11); *H04N 19/14* (2014.11); *H04N 19/157* (2014.11)

(58) Field of Classification Search
CPC .................. H04N 19/00127; H04N 19/00157; H04N 19/00212; H04N 19/00187; H04N 19/00266
USPC .......................................................... 375/240
See application file for complete search history.

(56) References Cited

U.S. PATENT DOCUMENTS

| | | | |
|---|---|---|---|
| 5,541,852 A * | 7/1996 | Eyuboglu et al. ............. 709/232 |
| 6,115,421 A * | 9/2000 | Katta et al. .................... 375/240 |
| 6,526,099 B1 * | 2/2003 | Christopoulos et al. . 375/240.26 |
| 7,251,275 B2 * | 7/2007 | Wu et al. .................. 375/240.03 |
| 7,706,441 B2 * | 4/2010 | Choi et al. ............... 375/240.12 |
| 2002/0015442 A1 * | 2/2002 | Takeuchi et al. .............. 375/211 |
| 2005/0002453 A1 | 1/2005 | Chang et al. |
| 2005/0105815 A1 * | 5/2005 | Zhang et al. .................. 382/251 |
| 2006/0087585 A1 * | 4/2006 | Seo et al. .................... 348/385.1 |
| 2007/0291847 A1 * | 12/2007 | Shimauchi et al. ...... 375/240.16 |
| 2008/0107185 A1 | 5/2008 | Lefol et al. |
| 2008/0267213 A1 * | 10/2008 | Deshpande ................... 370/468 |
| 2009/0254657 A1 | 10/2009 | Melnyk et al. |

(Continued)

OTHER PUBLICATIONS

Ahmad, "Content and Resources based Mobile and Wireless Video Transcoding," *World Academy of Science, Engineering and Technology*, vol. 16, Aug. 21, 2006, 6 pages.

Medagama et al., "Transcoding based optimum quality video streaming under limited bandwidth," http://www.ent.mrt.ac.lk/dialog/documents/ICIIS_1.pdf, Dec. 28, 2009, 6 pages.

(Continued)

*Primary Examiner* — Sath V Perungavoor
*Assistant Examiner* — Peter D Le
(74) *Attorney, Agent, or Firm* — Bryan Webster; Kate Drakos; Micky Minhas

(57) ABSTRACT

An apparatus and method are disclosed for transcoding a compressed video stream. In one embodiment, a compressed video stream is decoded. A spatial resolution of the decoded video stream can then be dynamically modified. The video stream with the modified spatial resolution can be re-encoded and transmitted over a network for display on a client device. The spatial resolution can be dynamically modified based on a variety of techniques. For example, a current bitrate and quantization parameters associated with the frames can be used to determine the spatial resolution. Alternatively, the spatial and/or temporal complexity can be used to modify spatial resolution.

14 Claims, 11 Drawing Sheets

(56) References Cited

U.S. PATENT DOCUMENTS

| | | |
|---|---|---|
| 2009/0316778 A1 | 12/2009 | Kim et al. |
| 2011/0013692 A1* | 1/2011 | Cohen et al. ............. 375/240.02 |
| 2011/0032986 A1* | 2/2011 | Banger et al. ............ 375/240.07 |
| 2011/0164679 A1* | 7/2011 | Satou et al. ............. 375/240.03 |

OTHER PUBLICATIONS

Song et al., "Adaptive rate control algorithms for low bit rate video under networks supporting bandwidth renegotiation," *Signal Processing: Image* Communication, vol. 17, 2002, pp. 759-779.

\* cited by examiner

FIG. 7
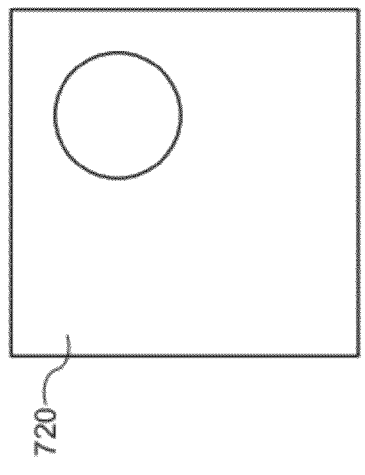 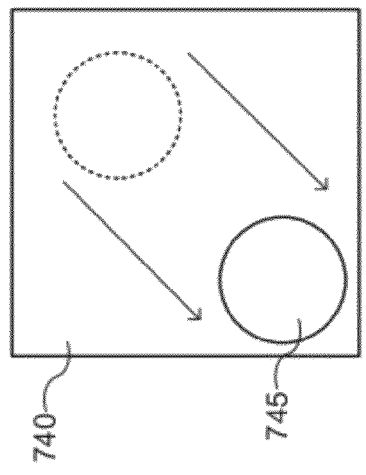
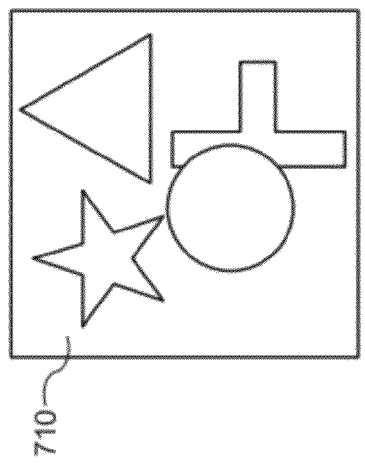 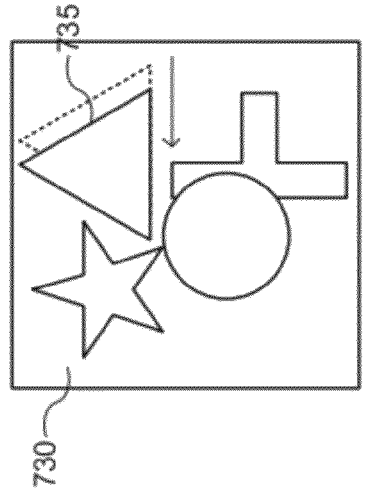
Differences in Spatial Complexity
Differences in Temporal Complexity

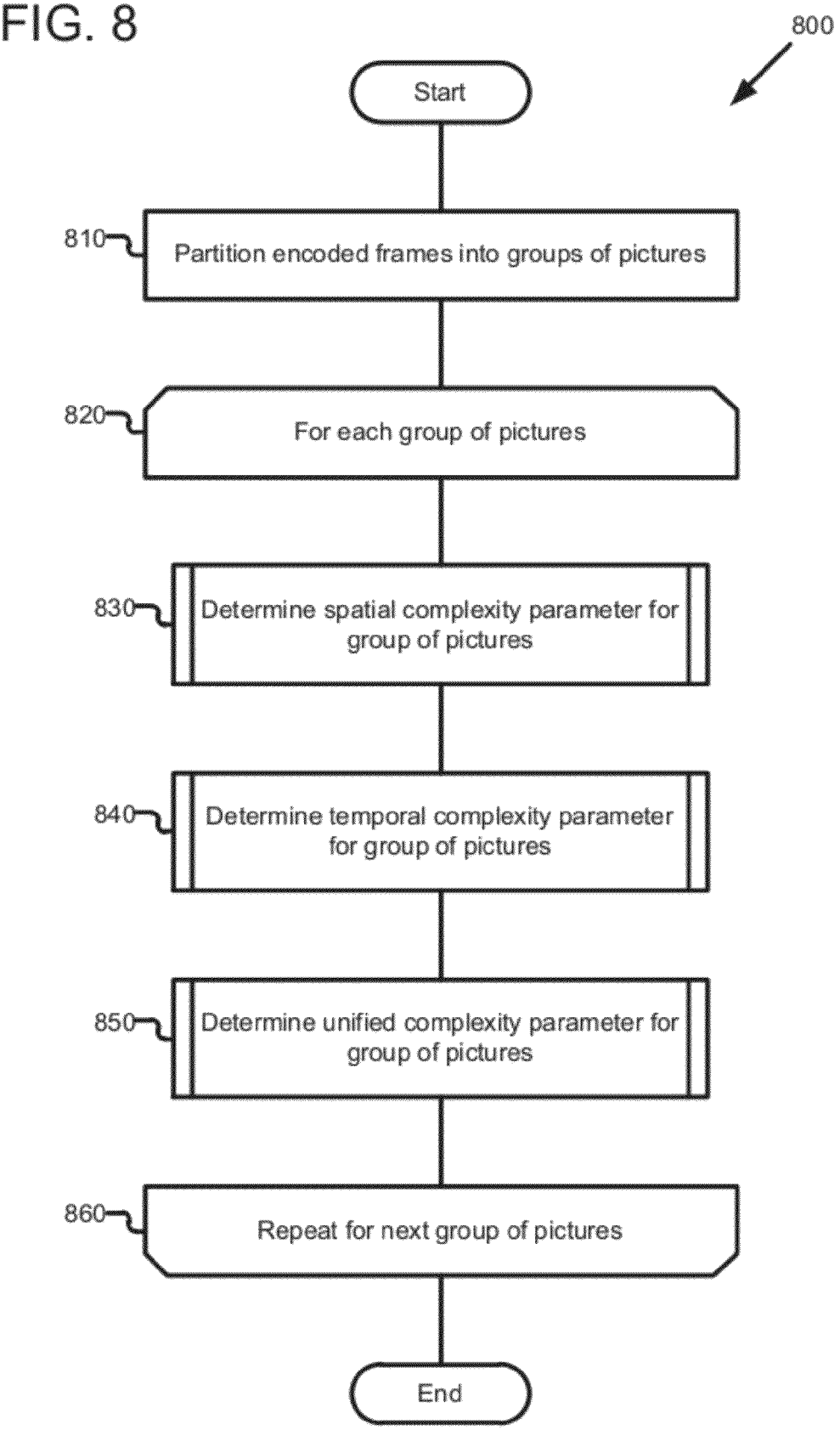

VIDEO TRANSCODING WITH DYNAMICALLY MODIFIABLE SPATIAL RESOLUTION

FIELD

The present application concerns video transcoding, and particularly, dynamically modifying resolution of a video stream while transcoding.

BACKGROUND

With the increasing popularity of playing streaming audio and video over networks such as the internet, there is a need for optimizing the data transferred from a server to a client such that the client's experience is maximized even if network conditions during playback are inconsistent. Optimizing the client's experience involves choosing a quality level for encoding the video portions of the video playback such that the video can be transferred and reconstructed uninterrupted while preserving the quality of the video content.

The quality level is generally dictated by the bit rate specified for the encoded video portions of the input stream. A higher bit rate generally indicates that a larger amount of information about the original video is encoded and retained, and therefore a more accurate reproduction of the original input video will be presented during video playback. Conversely, a lower bit rate indicates that less information about the original input video is encoded and retained, and thus a less accurate reproduction of the original video will be presented during video playback.

Generally, the bit rate is specified for encoding video based on several factors. The first factor is the network condition between the server and the client. A network connection that can transfer a high amount of data indicates that a higher bit rate can be specified for the input video that is subsequently transferred over the network connection. The second factor is the desired start-up latency. Start-up latency is the delay that a video playback tool experiences when first starting up due to the large amount of data that has to be received, processed, and buffered. The third factor is the tolerance to glitching. Glitching is when video playback has to stop because data is missing. In most cases any amount of start-up latency or glitching is intolerable, and it is therefore desirable to optimize the bit rate specified such that the start-up latency and the glitching are minimized or eliminated.

Currently available commercial streaming media systems rely on multi bit rate (MBR) coding to perform coding rate control. In MBR coding, source video content is encoded into alternative bit streams at different coding rates and typically stored in the same media file at the server. This then allows the content to be streamed in segments or chunks at varying levels of quality corresponding to different coding rates according to the changing network conditions, typically using bit stream switching between segments.

Transcoding is another technique that can be used, wherein rather than storing content at different encoding rates, the content is transformed from one compressed format to another in real-time, while it is being transmitted over the network. Real-time transcoding in a many-to-many way (any input format to any output format) is becoming a necessity to provide true search capability for any multimedia content on any mobile device, with over 500 million videos on the web and a plethora of mobile devices.

New techniques for improving video quality while transcoding are constantly in demand.

SUMMARY

An apparatus and method are disclosed for transcoding a compressed video stream.

In one embodiment, a compressed video stream is decoded. A spatial resolution of the decoded video stream can then be dynamically modified. The video stream with the modified spatial resolution can be re-encoded and transmitted over a network connection for display on a client device, such as a mobile phone, computer, etc. The spatial resolution can be dynamically modified based on a variety of techniques. For example, a current bitrate being transmitted and quantization parameters associated with the frames can be used to determine the modified spatial resolution. Alternatively, spatial and/or temporal complexity of the video frames can be used to modify spatial resolution.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

The foregoing and other objects, features, and advantages of the invention will become more apparent from the following detailed description, which proceeds with reference to the accompanying figures.

BRIEF DESCRIPTION OF THE DRAWINGS

FIG. 7 illustrates the differences between spatial and temporal complexity.

FIG. 8 is a flowchart illustrating determination of the spatial and temporal complexity.

DETAILED DESCRIPTION

Figure 1:
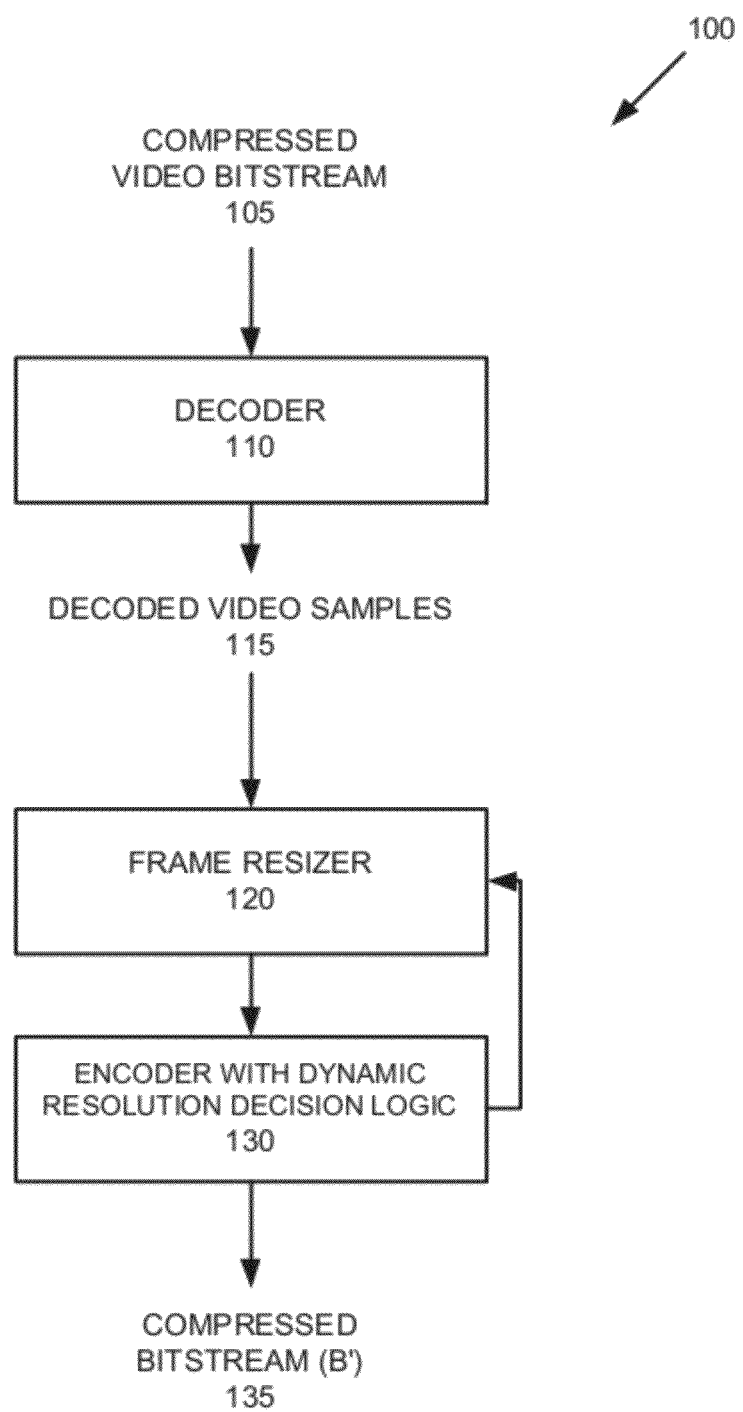
FIG. 1 is a block diagram of a generalized operating environment in conjunction with which various described embodiments may be implemented.

FIG. 1 is a generalized illustration of a method for implementing transcoding with dynamically modifiable spatial resolution. As shown at 105, a compressed video bitstream can be received into a decoder 110. The decoder 110 decodes the video bitsteam into a sequence of video frames or samples. The decoded video samples 115 are supplied to a frame resizer 120 that receives a feedback input from an encoder 130. As described further below, the encoder 130 receives a video bitstream from the frame resizer with a modified spatial resolution. The encoder 130 includes spatial resolution decision logic that decides whether the spatial resolution should be modified in order to maximize quality. Factors used by the spatial resolution decision logic include one or more of the following: current bit rate being transmitted over the network, quantization parameters, spatial complexity, and/or temporal complexity. The encoder outputs a re-encoded bitstream 135 that can be transmitted over a network for playback on a target client device.

Figure 2:
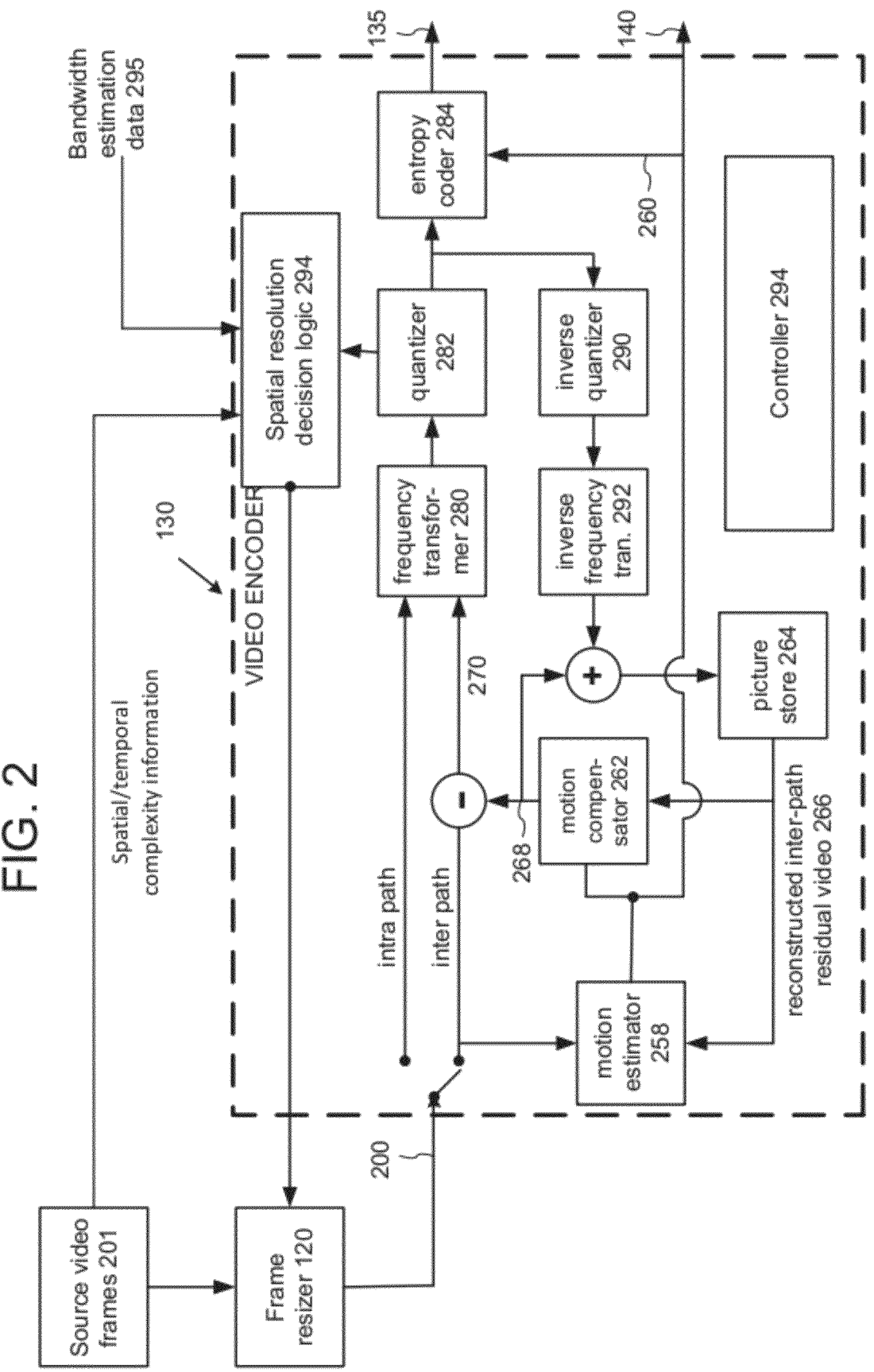
FIG. 2 shows a video encoder being used in conjunction with a frame resizer to modify spatial resolution of a video stream.

FIG. 2 is a generalized block diagram showing one example suitable implementation of the video encoder 130. Source video frames 201 can be compressed or uncompressed data and is input to the frame resizer 120. The video encoder 130 receives a sequence of video pictures (frames) as its video content input from the frame resizer 120 and produces a compressed bit stream 135 as output. The video encoder may also output the motion information that it used for inter-frame compression of the input video content as motion information output 140. The video encoder 130 processes video pictures. The term "picture" generally refers to source, coded, or reconstructed image data. For progressive video, a picture is a progressive video frame. For interlaced video, a picture may refer to an interlaced video frame, the top field of the frame, or the bottom field of the frame, depending on context. The video encoder 130 compresses inter-coded, predicted pictures of the input video and intra-coded pictures of the input video. For the sake of presentation, FIG. 2 shows a path for intra-coded frames through the encoder 130 and a path for inter-coded predicted frames. Many of the components of the video encoder 130 are used for compressing both intra-coded content and inter-coded, predicted content. The exact operations performed by those components can vary depending on the type of information being compressed.

In general, within the video encoder 130, an inter-coded, predicted frame (as a picture) is represented in terms of prediction from previously reconstructed content (as one or more other pictures, which are typically referred to as reference pictures or anchors). For example, content at a given time is encoded as a progressive P-frame or B-frame, interlaced P-field or B-field, or interlaced P-frame or B-frame. Within the video encoder 130, a prediction residual is the difference between predicted information and corresponding intra-coded frames.

The input video 200 content on the inter-path is encoded as a predicted picture based on motion information. The motion estimator 258 estimates motion of macroblocks or other sets of samples of the video picture with respect to one or more reference pictures, which represent reconstructions of previously encoded video content frames. The picture store 264 buffers this reconstructed video content 266 as a reference picture or pictures. When multiple reference pictures are used, the multiple reference pictures can be from different temporal directions or the same temporal direction. The motion estimator 258 outputs motion information 260 such as motion vector information. The motion compensator 262 applies motion vectors to certain reconstructed video content 266 (stored as reference picture(s)) when forming a motion-compensated current picture 268. The difference (if any) between a block of the motion-compensated picture 268 and corresponding block of the original inter-path video picture is the prediction residual 270 for the block.

A frequency transformer 280 converts spatial domain video information into frequency domain (i.e., spectral, transform) data. For block-based video content, the frequency transformer 280 applies a DCT, variant of DCT, or other forward block transform to blocks of the samples or prediction residual data, producing blocks of frequency transform coefficients. The frequency transformer 280 may apply an 8.times.8, 8.times.4, 4.times.8, 4.times.4 or other size frequency transform.

A quantizer 282 then quantizes the blocks of transform coefficients. The quantizer 282 applies non-uniform, scalar quantization to the spectral data with a step size that varies on a picture-by-picture basis, macroblock-by-macroblock basis or other basis. Additionally, in some cases the quantizer varies quantization across color channels of the inter-layer residual video picture. The quantizer 282 can also apply another type of quantization, for example, a uniform or adaptive quantization for at least some spectral data coefficients, or directly quantizes spatial domain data in an encoder system that does not use frequency transformations.

When reconstructed video content is needed for subsequent motion estimation/compensation of an inter-path video picture, an inverse quantizer 290 performs inverse quantization on the quantized spectral data coefficients. An inverse frequency transformer 292 performs an inverse frequency transform, producing blocks of reconstructed prediction residuals (for predicted inter-path residual video content) or samples (for intra-path residual video content). If the residual video content 256 was motion-compensation predicted, the reconstructed prediction residuals are added to the motion-compensated predictors 268 to form the reconstructed residual video. The picture store 264 buffers the reconstructed residual video for use in subsequent motion-compensated prediction.

The entropy coder 284 compresses the output of the quantizer 282 as well as certain side information (e.g., quantization parameter values). Typical entropy coding techniques include arithmetic coding, differential coding, Huffman coding, run length coding, LZ coding, dictionary coding, and combinations of the above. The entropy coder 284 typically uses different coding techniques for different kinds of information, and can choose from among multiple code tables within a particular coding technique.

When the video encoder 240 performs intra-compression of the intra-path video content, the encoder intra-compresses it as an intra-coded picture, without motion compensation. The video 256 is provided directly to the frequency transformer 280, quantizer 282, and entropy coder 284 and output as encoded video. A reconstructed version of the intra-coded video can be buffered for use in subsequent motion compensation of other inter-path video.

The quantizer 282 can also provide an output of quantization parameters to the spatial resolution decision logic 294. The spatial resolution decision logic 294 can use the quantization parameters to make decisions about whether to increase or reduce spatial resolution. The logic 294 can also input bandwidth estimation data 295 (which relates to the current coded bitrate). Further, the spatial resolution decision logic can input the source of the video frames 201 to receive the spatial/temporal complexity information. Based on one or more of these inputs, the spatial resolution decision logic provides a feedback output to the frame resizer 120 with control signals indicating how to resize the frame of the decompressed video content. Through this feedback mechanism, dynamic modification of the spatial resolution is achieved.

A controller 294 receives inputs from various modules such as the motion estimator 258, frequency transformer 280, quantizer 282, inverse quantizer 290, and entropy coder 284. The controller 294 evaluates intermediate results during encoding, for example, setting quantization step sizes and performing rate-distortion analysis. The controller 294 works with other modules to set and change coding parameters during encoding. When the controller 294 evaluates different coding parameter choices, the controller 294 may iteratively perform certain stages to evaluate different parameter settings, or the controller 294 may jointly evaluate different coding parameters. The tree of coding parameter decisions to be evaluated, and the timing of corresponding encoding, depends on implementation. In some embodiments, the controller 294 also receives input from an encoding session wizard interface, other encoder application interface, or other source to designate video to be encoded using specific rules.

The encoder is a specific example and alternative designs can be used. Additionally, it should be recognized that the frame resizer 120 can be included in the encoder.

Figure 3:
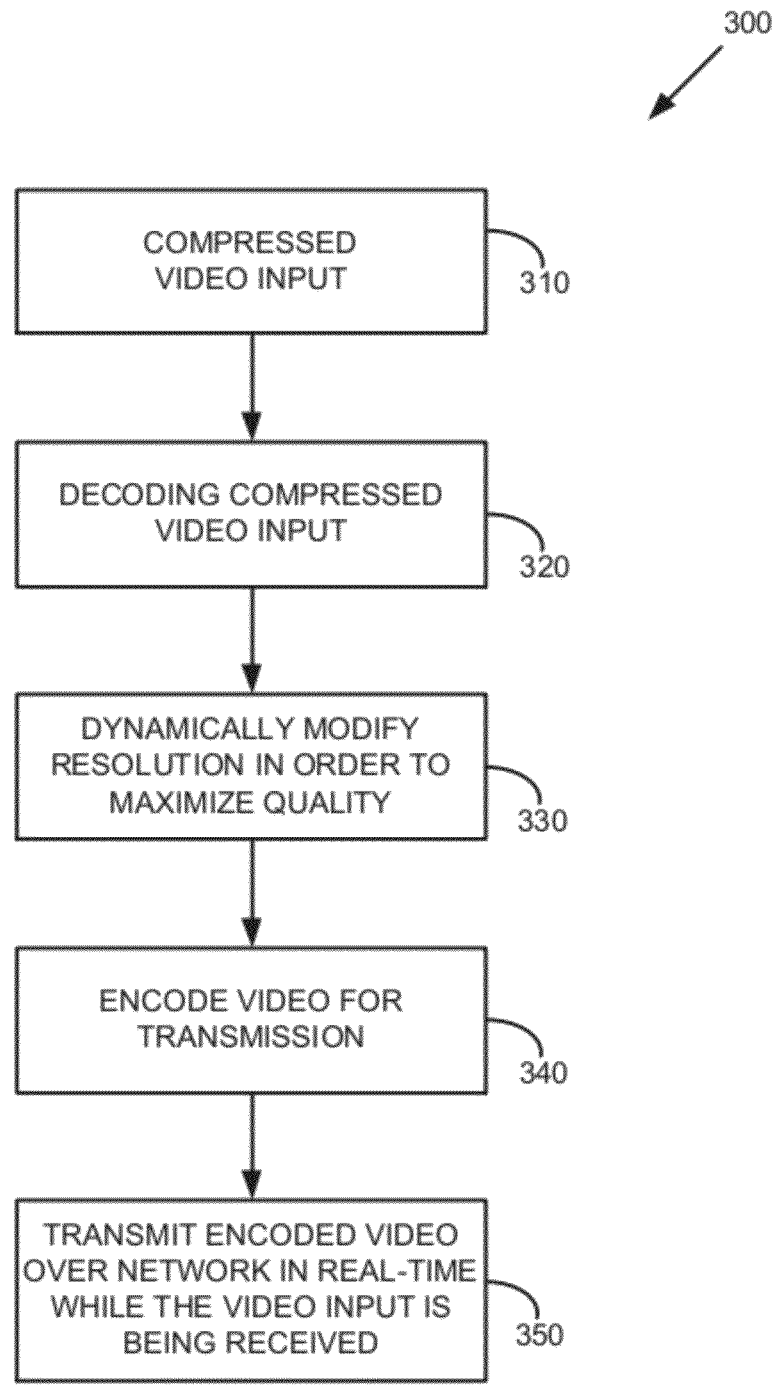
FIG. 3 is a flowchart of a method for dynamically modifying spatial resolution of a video stream.
Figure 4:
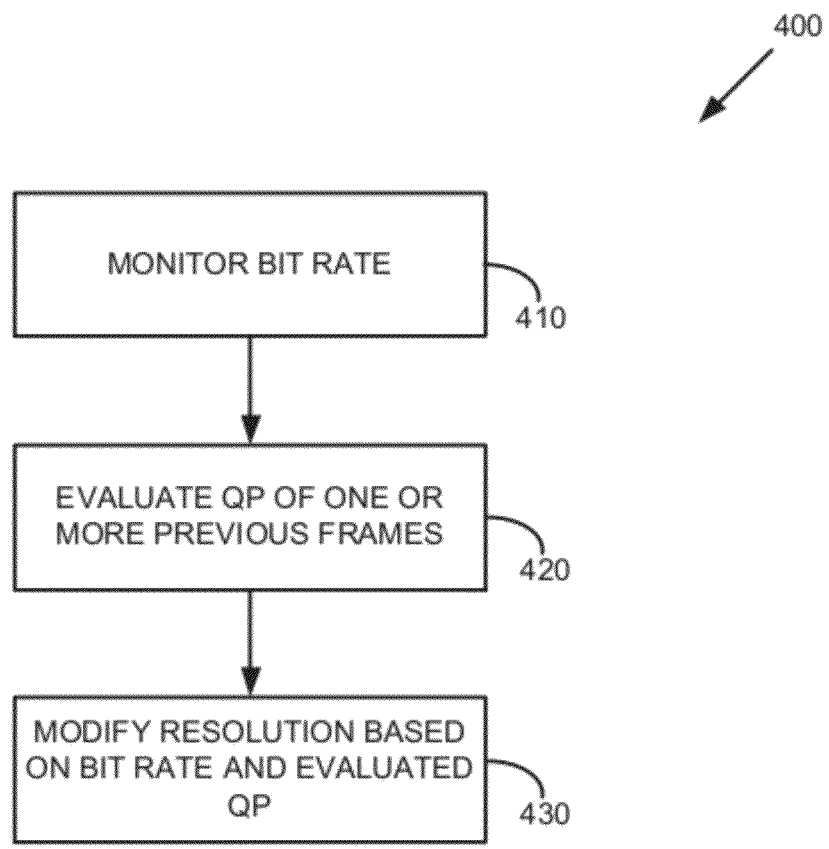
FIG. 4 is a detailed flowchart illustrating one embodiment for modifying spatial resolution based on bit rate and quantization parameters.
Figure 5:
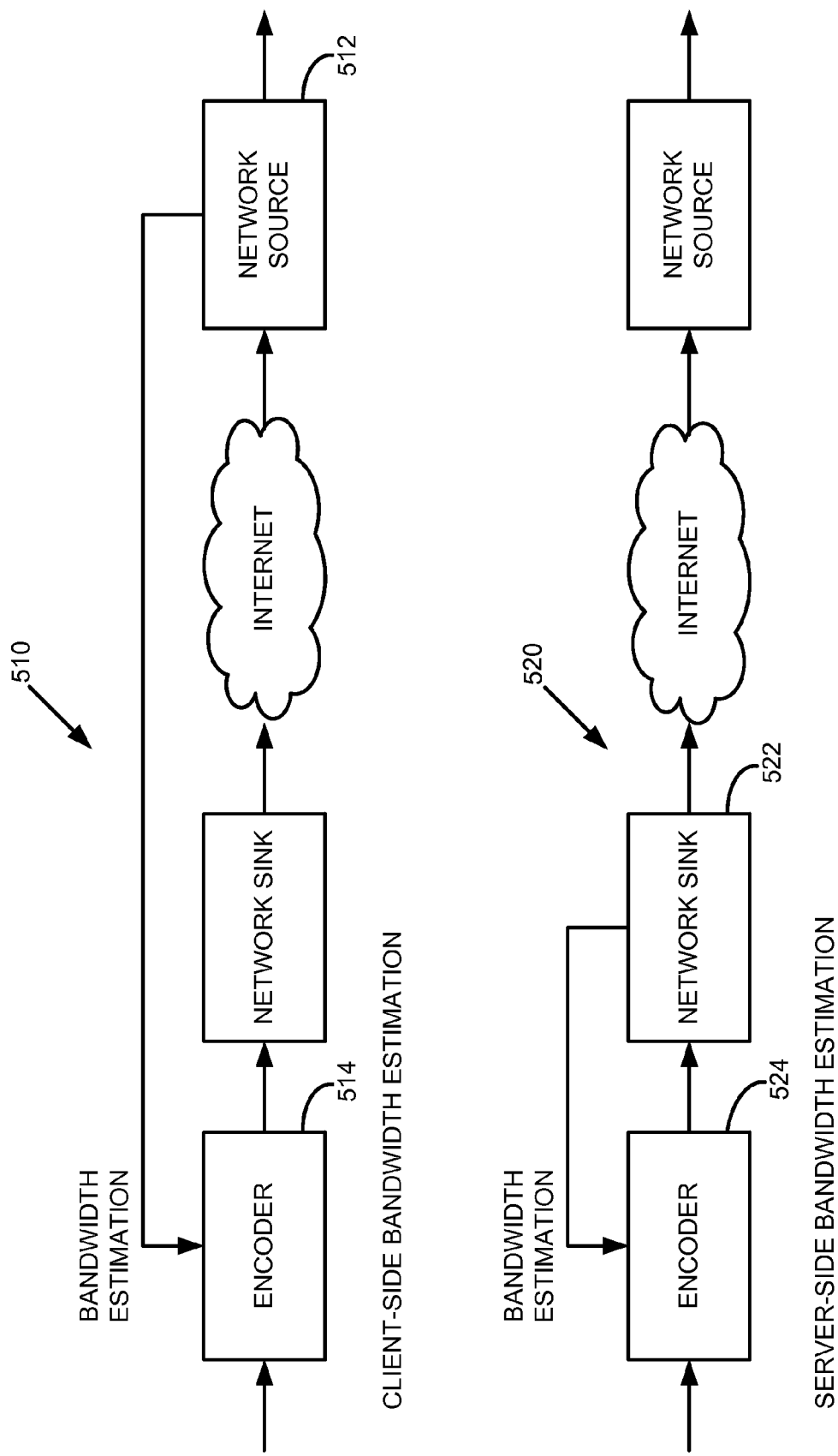
FIG. 5 is a system diagram showing alternatives embodiments for monitoring bit rate.
Figure 6:
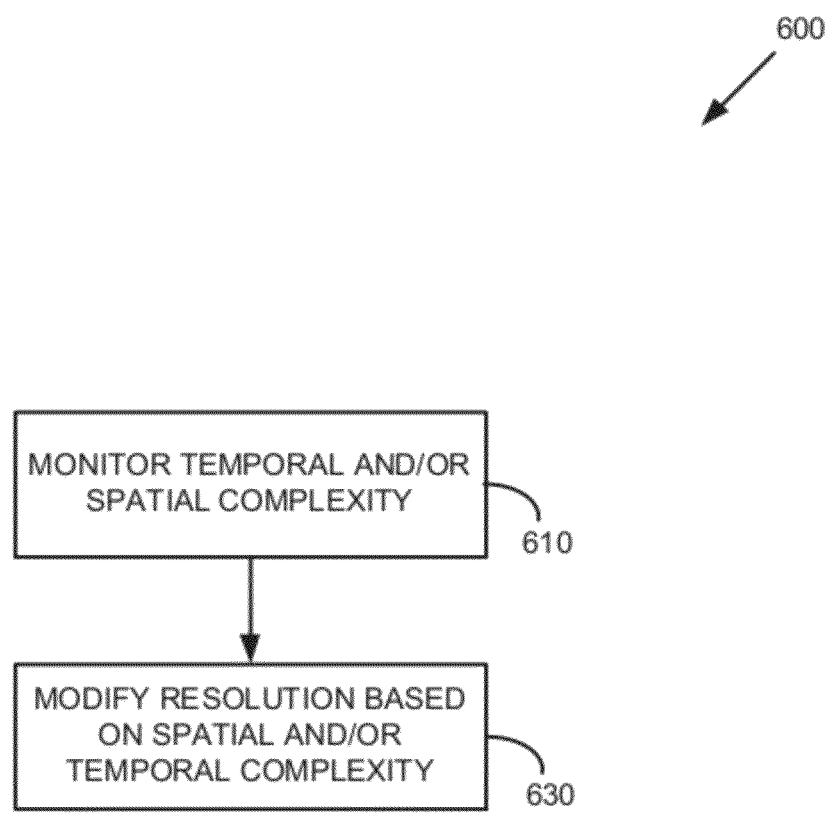
FIG. 6 is a detailed flowchart illustrating an embodiment for modifying spatial resolution based on spatial and/or temporal complexity.

FIG. 3 is a flowchart of a method for dynamically modifying resolution in order to maximize quality while transcoding a video stream. In process block 310, a compressed video input is received. In process block 320, the compressed video input is decoded using known techniques. In process block 330, the spatial resolution of the decoded video stream is dynamically modified in order to maximize quality. FIGS. 4-6 show additional details of how such a dynamic modification can be implemented. In any event, the spatial resolution is modified, which relates to the number of independent pixel values per unit length. While modifying the spatial resolution, the frames are passed to an encoder for encoding. The spatial resolution generally is modified on a boundary that includes a group of pictures.

In process block 350, the encoded video stream is transmitted over a network in real-time, while other frames of the video stream are being decompressed in process block 320. Thus, the simultaneous decoding, resizing, re-encoding, and transmitting provides for real-time transcoding with dynamic spatial resolution modification for maximized quality. After being transmitted over a network, the video stream can be displayed on a client device.

FIG. 4 shows one embodiment 400 for implementing process block 330 of FIG. 3. In process block 410, a bit rate for the network can be monitored. Generally, such a monitoring occurs through either server-side or client-side measuring of the packet transfer rate. Briefly turning to FIG. 5, at 510, bandwidth estimation is calculated by receiving packet transmission rate information sent from a client-side network source 512 to the encoder 514 (via the Internet) on a server computer. The bandwidth estimation is directly related to the bit rate. Alternatively, at 520, a network sink 522 can pass bandwidth estimation information to an encoder 524 through measurement of the packet transfer rate. Returning to FIG. 4, at process block 420, quantization parameters for one or more previous frames of the video stream are evaluated. Measuring of quantization parameters is well-known in the art, and any desired technique can be used. Additionally, any number of frames can be used and an average quantization parameter can be determined over the predetermined number of frames. In determining the quantization parameters, spatial and/or temporal complexity can be used, particularly for upper and lower thresholds of the local average frame quantization parameters. For example, an upper threshold of the local average frame quantization parameters is greater for content that has greater spatial and/or temporal complexity. This provides greater compression at a given resolution (so as to not lower resolution as aggressively) for content that exhibits high complexity than for content that exhibits low complexity. The reason for this is that compression artifacts are less noticeable in highly complex content.

In process block 430, the spatial resolution can be modified using the bit rate and the evaluated quantization parameters.

FIG. 6 shows an alternative embodiment 600 for implementing process block 330 of FIG. 3. In process block 610, temporal and/or spatial complexity can be monitored. FIGS. 7 and 8 further describe one embodiment for monitoring how to monitor the temporal and/or spatial complexity. In process block 630, the resolution is modified based on the spatial and/or temporal complexity. Generally, the more complex the scene, the more tolerance is available for compression artifacts. As described above, the quantization thresholds ($Q_h$ and $Q_l$) can be functions of the spatial and/or temporal complexity information. As a result, FIGS. 4 and 6 can be a combined embodiment, rather than alternative embodiments.

FIG. 7 is a block diagram illustrating examples of video pictures with differences in spatial and temporal complexity. FIG. 7 demonstrates how to determine parameters for spatial and temporal complexity for a group of pictures. The illustrations are chosen for their simplicity and serve only to represent the ideas of spatial and temporal complexity for a group of pictures, not to represent an actual group of pictures, or even particular pictures, themselves. Each of the ideas illustrated seeks to capture the idea that different source data may be more or less complex and different raw video data may exhibit complexities in different ways. Thus, a video containing a static room is easier, generally, to encode than a video capturing a busy street. By bifurcating complexities into temporal and spatial complexities, the calculations used to measure complexity are made simpler, both to understand and to implement.

Example images 710 and 720 illustrate differences in spatial complexity. In one implementation spatial complexity captures the idea of the number of details in a video frame. Thus, in the example shown, image 710, which contains many shapes, some of which are overlapped, contains a non-trivially greater amount of spatial complexity than does image 720, which has only a single circle in it. By contrast, in one implementation temporal complexity captures the difficulty in predicting one frame from a previously-encoded frame. An example of this is illustrated in images 730 and 740. Please note that in each of the two images 730 and 740 movement within the image is illustrated through the use of arrows and dotted figures; this is merely an abstraction of movement that would take place over the course of various frames within a group of pictures. In the examples of images 730 and 740, image 730 shows a lower temporal complexity than does image 740. This is because, while image 730 has a high spatial complexity, its only movement, and thus the only part of the frame that needs to be predicted, is a simple sideways movement of the triangle 735. In contrast, image 740 shows a large movement of the circle 745, which provides a more difficult task of prediction, and therefore raises the level of temporal complexity of the group of pictures represented by image 740.

FIG. 8 is a flowchart of an example process 800 performed by the video encoding system for determining complexity parameters from encoding statistics. In various implementations, the illustrated process blocks may be merged, divided into sub-blocks, or omitted. The process begins at block 810, where the system partitions frames encoded into groups of pictures. In a preferred implementation, the term "group of pictures" is a term of art, used to refer to a set of one or more frames containing at least a single I-frame as well as P- and B-frames when applicable. Thus, the process of block 810, in one such an implementation, partitions the encoded frames into smaller sets of frames until each set contains only one I-frame. In alternative implementations different partitions may be used. Additionally, while the process of block 810 discusses the partitioning of "frames" for the purpose of simplicity of description, in some implementations the process may be performed only with reference to video statistics. Thus, both the partitioning and further analysis may be done solely through manipulation of statistics which are associated with frames. Next, at block 820, the process begins a loop to analyze each partitioned group of pictures. Then, at block 830, the system determines a spatial complexity parameter for the currently-analyzed group of pictures. This is followed, at block 840, by the system determining a temporal complexity parameter for the current group of pictures. The last illustrated block in the loop is at block 850, where a unified complexity parameter is determined for the group of pictures. While in some implementations, the unified complexity parameter is determined through manipulation of the previously-determined temporal and spatial complexity parameters, the unified complexity parameter can be determined through other analysis. In yet other implementations, a unified parameter may not be calculated at all, but instead individual parameters, such as the spatial and temporal complexity parameters computed in blocks 830 and 840, may be used. Finally, at block 860, the loop is repeated for the next group of pictures.

Figure 9A:
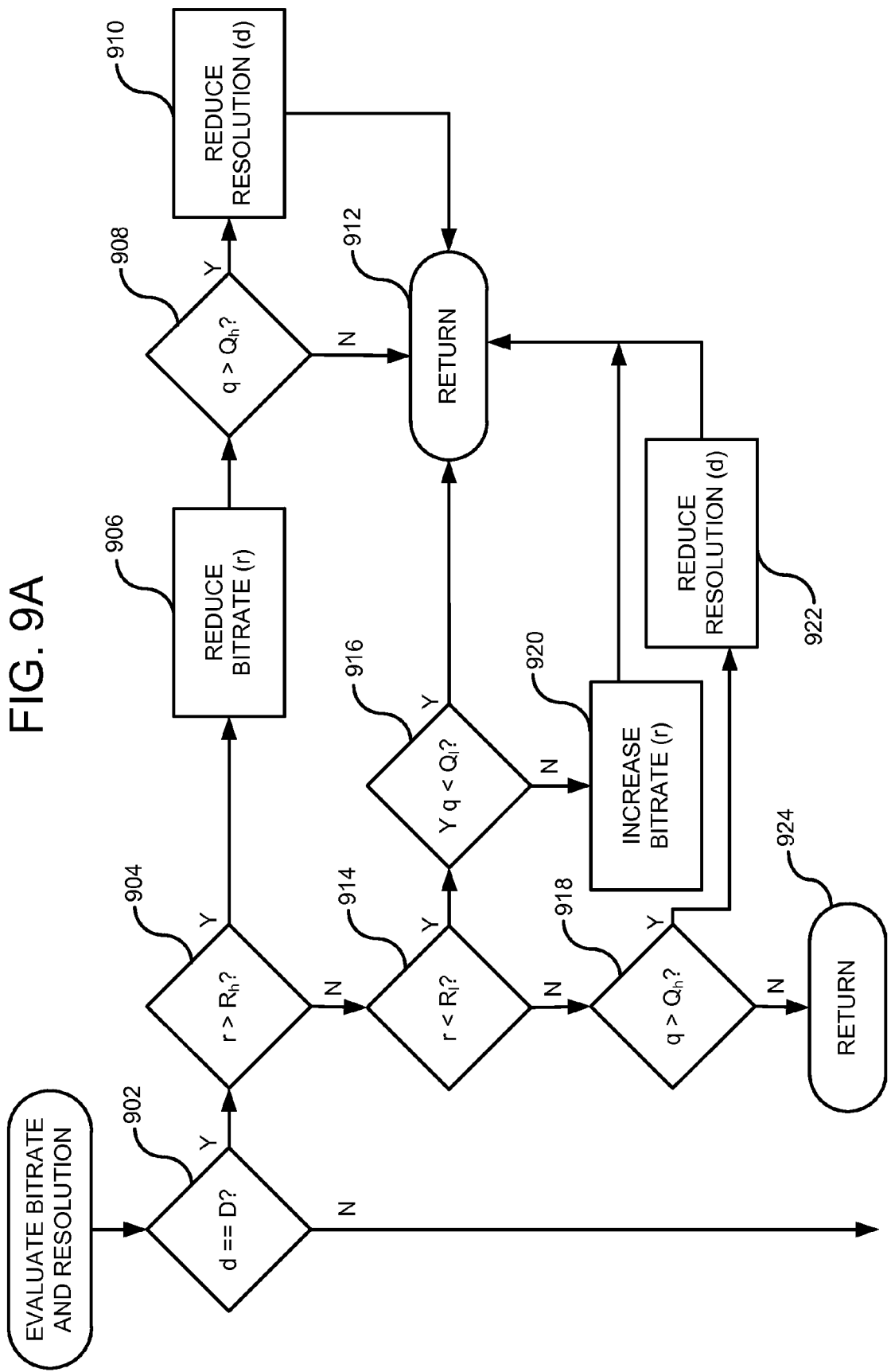
FIGS. 9A and 9B are a detailed flowchart illustrating a very particular embodiment wherein resolution can be modified based on bitrate and quantization parameters.
Figure 9B:
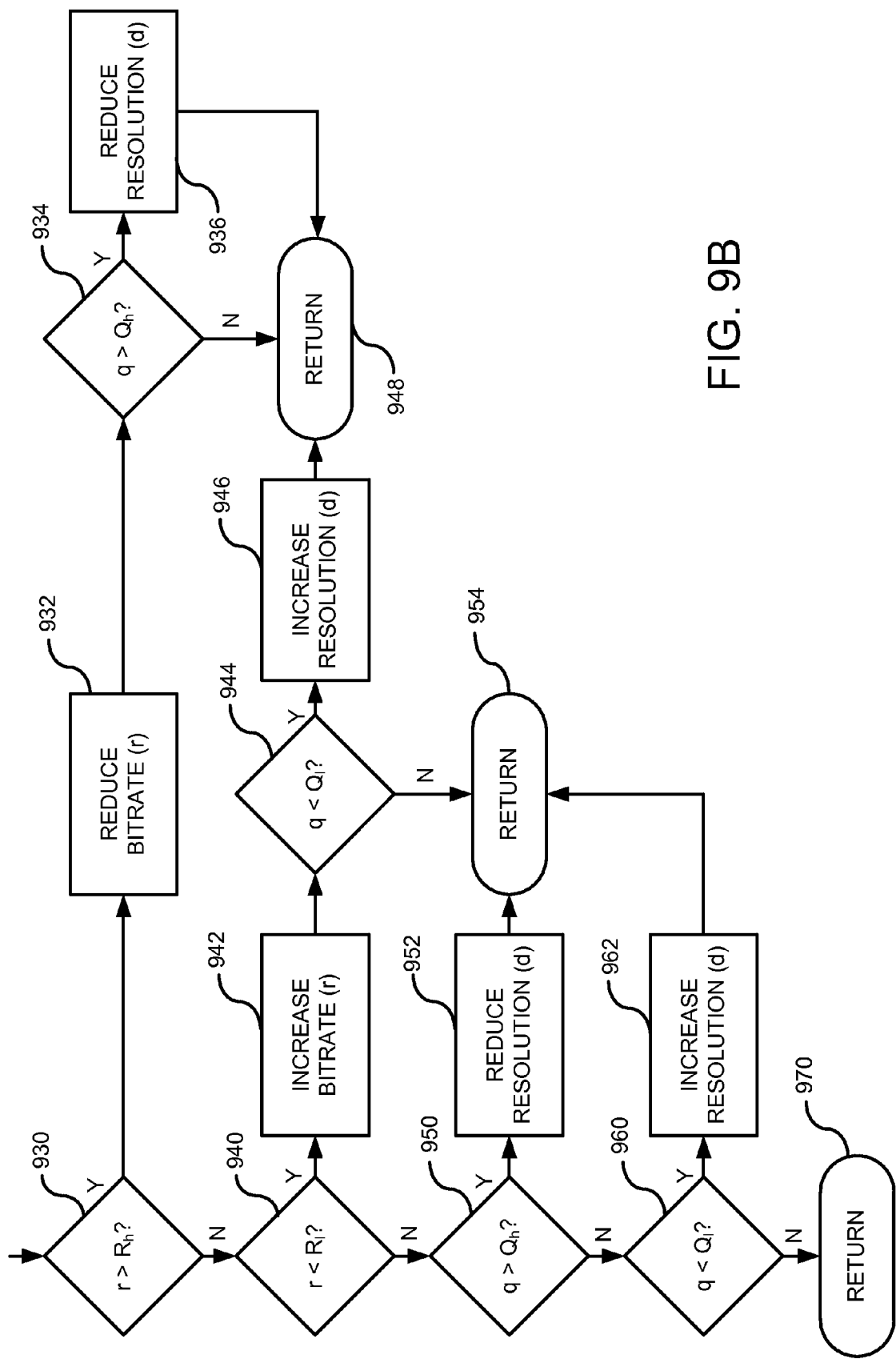

FIGS. 9A and 9B are a detailed flowchart that can be used in particular embodiments. The flowchart can be modified based on a desired particular implementation. In decision block 902, a current coded spatial resolution of the content (d) is compared to the spatial resolution of the source content (D). If they are equal, then the spatial resolution (d) cannot be increased further, as it cannot exceed the spatial resolution of the display on which it is playing at the client device. Assuming they are equal, then in decision block 904, current coded bitrate (r) is compared to the upper threshold ($R_h$) of the maximum video bandwidth. If the current coded bitrate is greater, then in process block 906, the bitrate is reduced. Next in decision block 908, the current local average of frame QPs (q) is compared to the upper threshold of the average frame QPs ($Q_h$). If q is greater, then the resolution is reduced in process block 910. If q is less than $Q_h$ then the process returns at process block 912. Recall that $Q_h$ is greater for content that has greater spatial and/or temporal complexity. Likewise, $Q_l$ is affected by spatial and/or temporal complexity.

If decision block 904 is answered in the negative, the current coded bitrate (r) is compared to the lower threshold of the maximum video bandwidth $R_l$ (914). If the coded bitrate is less than the lower threshold, then (q) is compared to the lower threshold of the average frame QPs ($Q_l$) (916). If q is the lesser of the two, then the process returns (912). If the q is not the lesser, then the bitrate is increased (920) and the process returns (912).

If decision block 914 is answered in the negative, then in decision block 918, the current local average (q) of frame QPs is compared to the upper threshold of the average frame QPs ($Q_h$). If q is less $Q_h$, then the process returns (924). If it is greater, then the resolution is reduced process block 922.

If decision block 902 is answered in the negative, then in decision block 930, the current coded bitrate (r) is compared to the upper threshold ($R_h$) of the maximum video bandwidth. If (r) is greater than ($R_h$) then the bitrate is reduced at process block 932. Then in decision block 934, the current local average (q) of frame QPs is compared to the upper threshold of the average frame QPs ($Q_h$). If (q) is greater, then the resolution is reduced (936). If (q) is less, then the process returns (948).

If decision block 930 is answered in the negative, then the current coded bitrate (r) is compared to the lower threshold of the maximum video bandwidth $R_l$ (940). If (r) is less, then the bitrate is increased (942). In decision block 944, the current local average (q) of frame QPs is compared to the lower threshold of the average frame QPs ($Q_l$). If q is the lesser of the two, then the resolution is increased (946) and the process returns (948). Otherwise, if q is the greater of the two, the process returns at 954.

If decision block 940 is answered in the negative, then in process block 950, the current local average (q) of frame QPs is compared to the upper threshold of the average frame QPs ($Q_h$). If (q) is greater, then the resolution is reduced (952) and the process returns 954. If (q) is less, then in decision block 960, (q) is compared to the lower threshold of the average frame QPs ($Q_l$). If (q) is the lesser of the two, then resolution is increased (962) and the process returns (954). Otherwise, if decision block 960 is answered in the negative, the process returns (970).

It should be understood that the upper threshold for the video bitrate is denoted as $R_h$ and is computed as:

$$R_h = R \times f_h$$

The value fh is a factor that allows cushion in the total available bandwidth, mainly to allow for audio. For example, if the current bandwidth is measured as 4 Mbps and fh=0.9 then the upper video bitrate threshold will be 3.6 Mbps.

The lower threshold for the video bitrate is denoted as Rl. The value is computed as:

$$R_l = R \times f_l$$

The value fl is a factor that relates the current total available bandwidth to the lower threshold. For example, if the current bandwidth is measured as 4 Mbps and fl=0.5 then the upper video bitrate threshold will be 2.0 Mbps.

The effective average frame quantizer is denoted q and is computed by summing up the previous N frame QPs and computing q as:

$$q = \left[\left(\sum_{n=0}^{N} Q_n\right)/N\right] \times f$$

Where:
N=the number of frames in the window
$Q_n$=The QP of frame n
f=is computed as:

$$f = \left(\left(\left(\sum_{n=0}^{M} b_n\right)/M\right) + i\right) \times [F/B]$$

Where:
$b_n$=the number of bits in frame n
M=the number of inter-coded frames in the window
F=the framerate in frames per second
B=the current target bitrate in bits per second
i=normalized number of intra-coded frame bits per frame, computed as:

$$i = \left(\sum_{n=0}^{K} I_n\right) / D$$

Where:

K=the number of intra-coded frames in the window (N=M+K)

$I_n$=the number of bits in frame n

D=the GOP distance in frames

For example if N is 10 and the 10 frame QPs were: 10, 12, 14, 14, 16, 18, 18, 20 and 21. And 9 of 10 frames were inter-coded with the following bits: 10000, 12000, 9000, 8000, 7000, 6000, 8000, 11000 and 7000. And one of the frames was intra-coded with 50000 bits, QP=8 and the GOP distance was 30 frames. And the framerate is 30 fps and the target bitrate is 300 kbps.

Then:

i=50000/30=1666.7

Then f=(78000/9+1666.7)×(30/300000)=1.033 q=(151/10)×1.033=15.6

Figure 10:
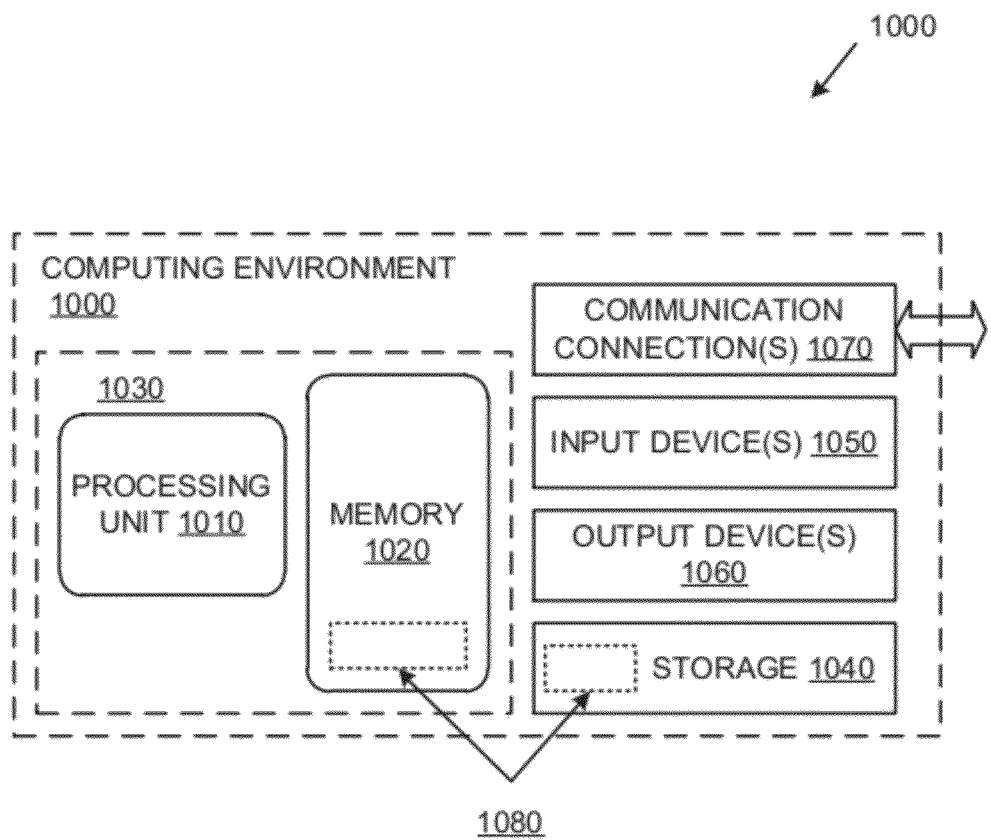
FIG. 10 shows an exemplary computer system that can be used to implement embodiments described herein.

FIG. 10 illustrates a generalized example of a suitable computing environment 1000 in which described embodiments, techniques, and technologies may be implemented. The computing environment 1000 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, the computing environment 1000 includes at least one central processing unit 1010 and memory 1020. For the multi core motion information precalculation discussed above, the computer includes a multi core CPU having plural CPU cores. In FIG. 10, this most basic configuration 1030 is included within a dashed line. The central processing unit 1010 executes computer-executable instructions and may be a real or a virtual processor. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080 that can, for example, implement the technologies described herein. A computing environment may have additional features. For example, the computing environment 1000 includes storage 1040, one or more input devices 1050, one or more output devices 1060, and one or more communication connections 1070. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other medium which can be used to store information and which can be accessed within the computing environment 1000. The storage 1040 stores instructions for the software 1080, which can implement technologies described herein.

The input device(s) 1050 may be a touch input device, such as a keyboard, keypad, mouse, pen, or trackball, a voice input device, a scanning device, or another device, that provides input to the computing environment 1000. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, or another device that provides output from the computing environment 1000.

The communication connection(s) 1070 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1000. By way of example, and not limitation, with the computing environment 1000, computer-readable media include memory 1020, storage 1040, the communication medium, and combinations of any of the above. As should be readily understood, the term computer-readable storage media includes the media for data storage such as memory 1020 and storage 1040, and not simply transmission media such as modulated data signals.

Any of the methods described herein can be performed via one or more computer-readable media (e.g., storage or other tangible media) comprising (e.g., having or storing) computer-executable instructions for performing (e.g., causing a computing device, audio and/or video processing device, or computer to perform) such methods. Operation can be fully automatic, semi-automatic, or involve manual intervention.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method for transcoding a compressed video stream, comprising:

decoding the compressed video stream;

monitoring a network bit rate over which the video stream is to be transmitted;

dynamically modifying a spatial resolution of the decoded video stream, wherein the spatial resolution relates to a number of independent pixel values associated with a group of pictures comprising a plurality of individual pictures of the video stream, wherein dynamically modifying includes:

receiving the group of pictures, determining an average quantization parameter for the group of pictures, wherein the average quantization parameter is associated with a number of inter-coded pictures and a number of intra-coded picture bits, calculating a spatial complexity parameter and a temporal complexity parameter for the group of pictures, the spatial complexity parameter representative of a number of details in one of the group of pictures, and using the spatial complexity, temporal complexity, and average quantization parameters and the monitored bit rate to perform the modifying of the spatial resolution at a boundary of the group of pictures;

encoding the video stream at the modified spatial resolution for the group of pictures; and transmitting the encoded video stream at the modified spatial resolution for display while the compressed video stream is being received.

2. The method of claim 1, wherein transmitting is over a network connection and further including monitoring a bit rate of the network connection.

3. The method of claim 2, wherein monitoring the bit rate includes receiving a packet transmission rate from a client computer coupled to the network connection.

4. The method of claim 2, wherein monitoring the bit rate includes receiving a packet transmission rate estimation from a server-side network sink.

5. The method of claim 1, wherein the transcoding occurs on a server computer coupled to a network and further including displaying the transmitted encoded video stream on a client computer.

6. An apparatus for transcoding a compressed video stream, comprising:

a decoder for decoding a compressed video stream, the decoded video stream including a group of pictures;

an encoder with dynamic spatial resolution decision logic for re-encoding the video stream received from the decoder, wherein the encoder determines an average quantization parameter for the group of pictures, determines a spatial complexity parameter and a temporal complexity parameter for the group of pictures, and receives a bit rate of a network, the spatial complexity parameter being associated with details in one of the group of pictures, the average quantization parameter being associated with inter-coded picture information and intra-coded picture information;

a frame resizer positioned between the decoder and the encoder and responsive to control signals from the encoder for dynamically modifying a frame size of the decoded video stream at a boundary of the group of pictures and providing a resized decoded video stream with the modified frame size to the encoder, wherein modifying the frame size includes using the determined average quantization, spatial complexity, and temporal complexity parameters for the group of pictures in combination with the bit rate of the network.

7. The apparatus of claim 6, wherein the encoder includes a quantizer coupled to the dynamic spatial resolution decision logic, the quantizer for calculating quantization parameters of the resized decoded video stream and providing the quantization parameters to the dynamic spatial resolution decision logic.

8. The apparatus of claim 6, wherein the dynamic spatial resolution decision logic calculates the control signals based on current bitrate and current quantization, spatial complexity, and temporal complexity parameters.

9. The apparatus of claim 7, wherein the quantization parameters are calculated using a following formula:

$$q = \left[\left(\sum_{n=0}^{N} Q_n\right)/N\right] \times f$$

wherein N is a number of frames, Qn is a quantization parameter for a given frame n, and f is associated with available bandwidth.

10. The apparatus of claim 6, further including an input to the spatial resolution decision logic that receives data related to bandwidth of a network.

11. The apparatus of claim 10, wherein the data is packet transmission data received from a server-side network sink.

12. The apparatus of claim 10, wherein the data is packet transmission data received from a client computer that is receiving the re-encoded video stream from the encoder over a network.

13. A method for transcoding a compressed video stream, comprising:

receiving a video stream;

monitoring a bit rate of a network connection through which the video stream is being transmitted;

partitioning a group of pictures from the video stream;

determining an average quantization parameter for the group of pictures, wherein the average quantization parameter is associated with a number of inter-coded pictures within the group and a number of intra-coded picture bits per picture;

calculating a spatial complexity parameter and a temporal complexity parameter for the group of pictures, the spatial complexity parameter representative of details in one of the group of pictures;

resizing frames of the video stream at a boundary of the group of pictures based on the average quantization, spatial complexity, and temporal complexity parameters and the bitrate of the network connection;

encoding the video stream with the resized frames; and transmitting the encoded video stream over a network for display on a client computer coupled to the network.

14. The method of claim 13, wherein the encoding occurs on a server computer and wherein the bitrate is monitored by the client computer and passed to the encoder or by a network sink on the server computer.

* * * * *